US005473154A

United States Patent [19]
Eguchi et al.

[11] Patent Number: 5,473,154
[45] Date of Patent: Dec. 5, 1995

[54] OPTICAL PICKUP APPARATUS EMPLOYING NONPOLARIZATION BEAM SPLITTER AND QUARTER WAVELENGTH PLATE

[75] Inventors: Naoya Eguchi, Tokyo; Atsushi Fukumoto, Kanagawa, both of Japan

[73] Assignee: Sony Corporation, Tokyo, Japan

[21] Appl. No.: 224,170

[22] Filed: Apr. 7, 1994

[30] Foreign Application Priority Data

Apr. 26, 1993 [JP] Japan .................................. 5-099835

[51] Int. Cl.⁶ ......................................... G01J 1/20
[52] U.S. Cl. .................................. 250/201.5; 369/44.23
[58] Field of Search .................................. 250/216, 556, 250/568, 570, 201.5; 369/44.28, 44.29, 44.23, 110, 112, 44.14

[56] References Cited

U.S. PATENT DOCUMENTS

| | | | |
|---|---|---|---|
| 4,507,766 | 3/1985 | Saimi et al. | 250/201.5 |
| 4,973,836 | 11/1990 | Matsuoka | 250/201.5 |
| 5,097,463 | 3/1992 | Wagenblast et al. | 369/110 |

FOREIGN PATENT DOCUMENTS

| | | | |
|---|---|---|---|
| 0253613A2 | 1/1988 | European Pat. Off. | G11B 7/12 |
| 0331303A3 | 9/1989 | European Pat. Off. | H01S 3/108 |
| 0465676A1 | 1/1992 | European Pat. Off. | G11B 11/10 |

OTHER PUBLICATIONS

Patent Abstracts of Japan, vol. 16, No. 256 (P-1368), Oct. 6, 1992 & JP-A-04 060 930 (Pioneer), 26 Feb. 1992.

*Primary Examiner*—Edward P. Westin
*Assistant Examiner*—Que T. Le
*Attorney, Agent, or Firm*—Limbach & Limbach

[57] ABSTRACT

An optical pickup apparatus for irradiating a light beam on an optical recording medium for recording or reproduction, including a light source, an objective lens, a nonpolarization beam splitter, a photodetector, and a ¼ wavelength plate. The objective lens focuses the light beam radiated from the light source on to the recording layer of the optical recording medium. The nonpolarization beam splitter is disposed between the objective lens and the light source and separates the light beam emitted from the light source and the light beam reflected by the recording layer of the optical recording medium. The photodetector receives the beam of light reflected by the recording layer of the optical recording medium which has been separated by the nonpolarization beam splitter and deflected 90° in optical path. The ¼ wavelength plate is disposed on the path of emission of the light beam emitted from the light source between the nonpolarization beam splitter and the optical recording medium.

12 Claims, 7 Drawing Sheets

FIG. 3A $\Delta(Nx-Ny) = 0$
$\Delta(Nx-Nz) = 0$

FIG. 3B $\Delta(Nx-Ny) = a$
$\Delta(Nx-Nz) = b$ $\quad (a < b)$

FIG. 3C $\Delta(Nx-Ny) = -a$
$\Delta(Nx-Nz) = b$ $\quad (a < b)$

FIG. 3D $\Delta(Nx-Ny) = 0$
$\Delta(Nx-Nz) = b$

FIG. 4A $\Delta(Nx-Ny) = 0$
$\Delta(Nx-Nz) = 0$

FIG. 4B $\Delta(Nx-Ny) = a$
$\Delta(Nx-Nz) = b$ $(a<b)$

FIG. 4C $\Delta(Nx-Ny) = -a$
$\Delta(Nx-Nz) = b$ $(a<b)$

FIG. 4D

$\Delta(Nx-Ny) = 0$
$\Delta(Nx-Nz) = b$

OPTICAL PICKUP APPARATUS EMPLOYING NONPOLARIZATION BEAM SPLITTER AND QUARTER WAVELENGTH PLATE

BACKGROUND

1. Field of the Invention

The present invention relates to an optical pickup apparatus for irradiating a light beam on an optical recording medium for recording and/or reproduction. More particularly, the present invention relates to an optical pickup apparatus for irradiating a light beam on an optical recording medium for recording and/or reproduction using a nonpolarization beam splitter.

2. Background of the Invention

Recently, with the amount of information increasing so much, there have been demands for even higher recording densities of storage in the optical discs used for packaging media for audio and visual information such as computer storage devices, compact discs, and video discs. To obtain such higher density optical discs, it is necessary to either shorten the wavelength λ of the light beam emitted from the light source or else to increase the numerical aperture (NA) of the objective lens. This gives rises to several problems.

Figure 1:
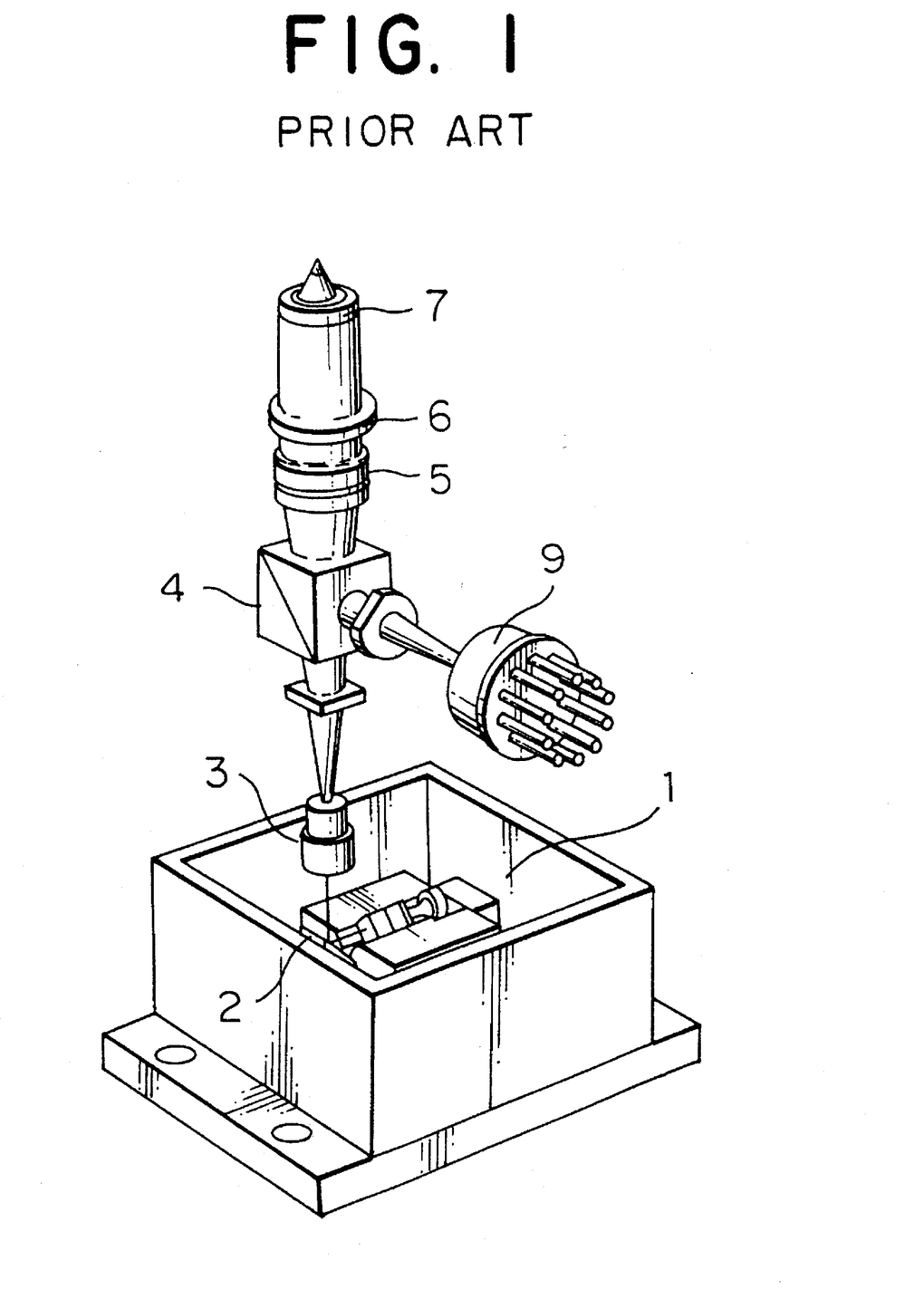
FIG. 1 is a perspective view of a conventional optical pickup apparatus.
Figure 2:
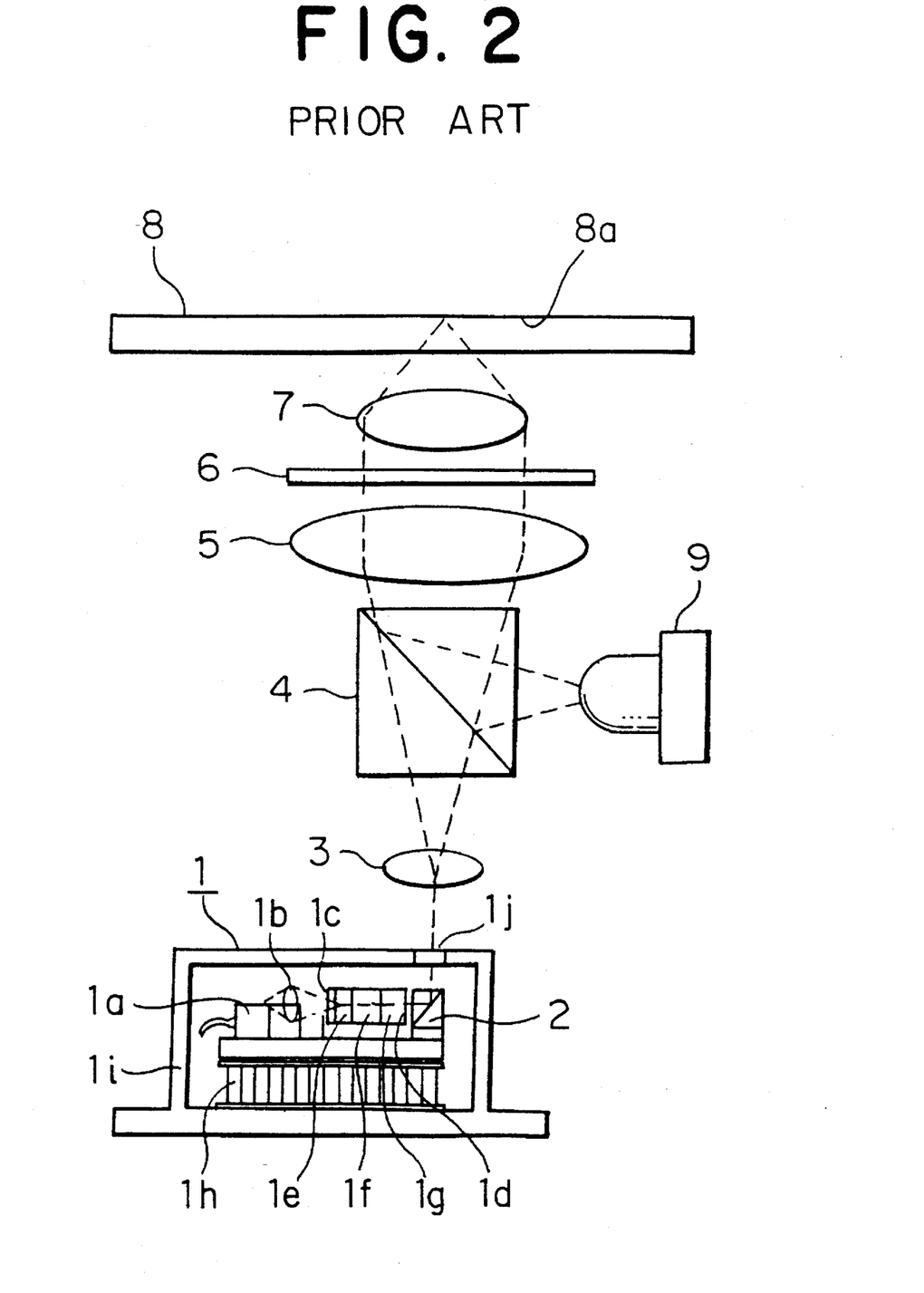
FIG. 2 is a view of the optical path of a conventional optical pickup apparatus.

A conventional example will be first described with FIGS. 1 and 2.

FIG. 1 is a perspective view of a conventional optical pickup apparatus. FIG. 2 is a view of the optical path of the optical pickup apparatus. Reference numeral 1 denotes a laser beam generating device used as a light source. The laser beam generating device 1 has a semiconductor laser 1a, a lens 1b, a pair of reflectors 1c and 1d, a ¼ wavelength plate 1e, a solid-state laser medium 1f, a non-linear optical crystal element 1g, a temperature control device 1h, and a cabinet 1i. The semiconductor laser 1a emits a pumping light beam for exciting the laser medium 1f. The lens 1b converges the pumping light beam radiated from the semiconductor laser 1a through the reflector 1c on the laser medium 1f. The pair of reflectors 1c and 1d constitute a resonator. The laser medium 1f and the nonlinear optical crystal element 1g are disposed in this resonator constituted by the pair of reflectors 1c and 1d. On one surface of the ¼ wavelength plate 1e, that is, the surface facing the semiconductor laser 1a, is provided the reflector 1c. The reflector 1c exhibits wavelength selectivity such that it transmits through the pumping light beam having a wavelength, for example, 810 nm radiated from the semiconductor laser 1a while reflecting the light beam generated by the laser medium 1f having a wavelength, for example 1064 nm. The ¼ wavelength plate 1e performs type II phase matching between the light beam emitted from the laser medium 1f i.e. the fundamental wavelength laser light beam and the second harmonic laser light beam generated by the non-linear optical crystal element 1g. For this type II phase matching, see U.S. Pat. No. 4,910,740. The laser medium 1f is a rod-shaped solid-state laser medium, such as Nd:YAG. The laser medium 1f is irradiated by the pumping light beam focused by the lens 1b through the reflector 1c. The laser medium generates the fundamental wavelength laser light beam. The non-linear optical crystal element 1g used is composed of KTP (KTiPO₄). This non-linear optical crystal element 1g generates second harmonic laser light beam responsive to the fundamental wavelength laser light beam irradiated thereto. The reflector 1d is provided at one surface of the non-linear optical crystal element 1g. The reflector 1d exhibits wavelength selectivity such that it reflects the light beam of the fundamental wavelength, such as the light beam of a wavelength of 1064 nm, and transmits through the second harmonic laser light beam generated by the non-linear optical crystal element 1g, such as a light beam having a wavelength of 532 nm. The ¼ wavelength plate 1e, the laser medium 1f, and the non-linear optical crystal element 1g are joined integrally with each other.

Reference numeral 2 denotes a mirror for deflecting the light beam to the upward direction. The mirror 2 deflects the second harmonic laser light beam outputted from the reflector 1d by 90° and emits it toward the beam expander later explained.

Reference numeral 1h denotes a single temperature control device, for example, a thermo-electric (TE) cooler. The temperature control device 1h performs temperature control for the mounting plate where the semiconductor laser 1a and the lens 1b are mounted, the block to which the resonator is arranged, and the base member to which the mirror 2 is attached. Reference numeral 1i denotes a cabinet for accommodating the semiconductor laser 1a, the lens 1b, the resonator, the mirror 2, and the temperature control device 1h. At the top surface of the cabinet 1i is provided a window 1j for emission of the second harmonic laser light beam deflected 90° by the mirror 2.

In the thus constituted laser beam generating device 1, the pumping light beam emitted from the semiconductor laser 1a is focused by the lens 1b and irradiated to the laser medium 1f through the reflector 1c and the ¼ wavelength plate 1e. The fundamental wavelength laser light beam is generated by the laser medium 1f responsive to the irradiated pumping light beam. This fundamental wavelength laser light beam is irradiated on the nonlinear optical crystal element 1g. The non-linear optical crystal element 1g generates the second harmonic laser light beam based on the fundamental wavelength laser light beam irradiated on it. This second harmonic laser light beam is transmitted through the reflector 1d serving as the output surface and is deflected 90° by the mirror 2. The second harmonic laser light beam deflected 90° by the mirror 2 is outputted through the window 1j toward the beam expander described below.

Reference numeral 3 denotes a beam expander, which expands the diameter of the second harmonic laser light beam emitted from the laser beam generating device 1. This beam expander 3 is, for example, composed of a combination of two concave lenses.

Reference numeral 4 denotes a polarization beam splitter. The polarization beam splitter 4 separates the second harmonic laser light beam generated from the laser beam generating device 1 and the later mentioned reflected light beam reflected by the optical disc serving as the optical recording medium and deflects by 90° the reflected light beam. Reference numeral 5 denotes a collimator lens which converts the second harmonic laser light beam expanded in diameter by the beam expander 3 into a parallel light beam. Reference numeral 6 is a ¼ wavelength plate which converts the linear polarized light beam outputted from the laser beam generating device 1 into a circularly polarized light beam and converts the reflected light beam reflected by the optical disc into a linear polarized light beam once again from the circularly polarized light beam. The direction of polarization of the light beam emitted from the laser beam generating device 1 and the direction of polarization of the reflected light beam reflected by the optical disc differ, however.

Reference numeral 7 denotes an objective lens, which focuses the light beam passing through the ¼ wavelength plate 6 on the recording surface of the optical disc. The objective lens 7 used is for example an aspherical single lens.

Reference numeral 8 denotes an optical disc used as the optical recording medium. The optical disc 2 includes a disc-shaped substrate of a thickness of 1.2 mm, as seen in a so-called compact disc, a recording layer provided on the surface of the disc-shaped substrate forming a recording surface 8a, and a protective layer provided on the recording layer. The recording layer is formed from a metallic material such as Al or Au in an exclusive read-only optical disc such as a compact disc and is formed from a phase changing type optical recording material or magneto-optical recording material in a recordable optical disc. The disc-shaped substrate, in the case of an exclusive read-only type optical disc, has the information signals recorded on it as indented pits on the recording surface and, in the case of a recordable optical disc, has the information signals recorded on it using changes in reflectivity or Kerr effect. The disc-shaped substrate is generally formed by a synthetic resin having optical transmittance, such as polyvinyl chloride (PVC), an acrylic resin such as polymethyl methacrylate (PMMA), and polycarbonate (PC). Among these, polycarbonate resin is superior as a material for the disc-shaped substrate in terms of its shock resistance, heat resistance, and dimensional stability at the time of injection molding and further is inexpensive in price.

Reference numeral 9 denotes a photodetector which receives the reflected light beam which has been polarized and separated by the polarization beam splitter 4.

As mentioned above, to increase the recording density of an optical disc, the technique has been used of increasing the numerical aperture (NA) of the objective lens 7 in addition to using a light source for emitting a light beam having a shorter wavelength.

If the numerical aperture (NA) of the objective lens 7 is made larger in order to obtain a high recording density optical disc, however, there is the problem that the birefringence of the disc-shaped substrate of the optical disc causes a degradation of the reproduced signal characteristics.

As mentioned above, in an optical disc with a disc-shaped substrate made of polycarbonate, the disc-shaped substrate generally has a biaxial birefringence (note that an explanation of the birefringence is given in Morikita Shuppan "Latest-Applied Physics Series 1: Crystal Optics", pp. 65 to 68 etc.)

In this case, in a polarization type optical system such as shown in FIGS. 1 and 2, while there was not that much of a problem with a system with a low numerical aperture (NA) of 0.45 or so (for example, a compact disc player system), if applied to a system with a high numerical aperture (NA) of about 0.6 (for example, a high recording density optical disc drive system), it was confirmed that the reproduced frequency characteristics fell significantly compared with the compact disc player system.

The birefringence in the thickness direction of the disc-shaped substrate of the polycarbonate forming the disc-shaped substrate of the optical disc is non-linear, so the state of polarization of the light beam of the portion corresponding to the outer circumference portion of the objective lens ends up changing. Therefore, it is not possible to detect all of the light beam reflecting from the optical disc by the polarization beam splitter. Namely, part of the reflected light beam is not emitted toward the photodetector, and part of the reflected light beam transmitted through the polarization beam splitter is returned to the light source. As a result, despite an objective lens with a high numerical aperture (NA) being used, the situation ends up equivalent to the reproduction of the optical disc using an objective lens with a small numerical aperture (NA). Due to this, the reproduced frequency characteristics deteriorate despite the use of the objective lens having the high numerical aperture (NA).

This will be explained in further detail using the results of measurements.

FIGS. 3A to 3D and FIGS. 4A to 4D show the results of measurement of the signal level with respect to the distribution of light intensity and spacial frequency (modulation transfer function: MTF) using optical discs having four types of birefringence.

Figure 3A:
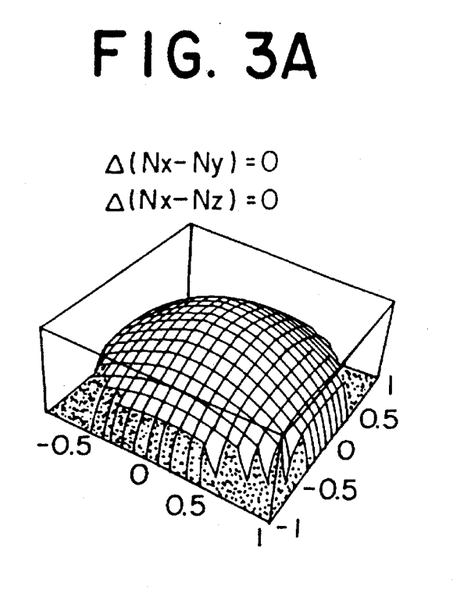
FIG. 3A is a view of the distribution of light intensity of an optical disc having a disc-shaped substrate comprised of glass with an in-plane birefringence and perpendicular birefringence of zero.
Figure 3B:
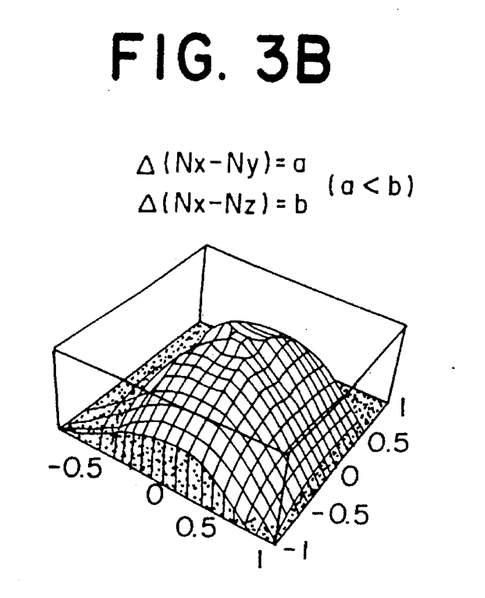
FIGS. 3B and 3C are views of the distribution of light intensity of an optical disc having an in-plane birefringence and perpendicular birefringence.
Figure 3C:
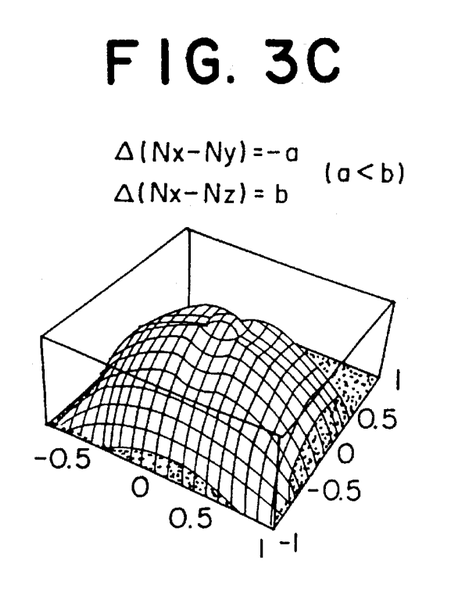
Figure 3D:
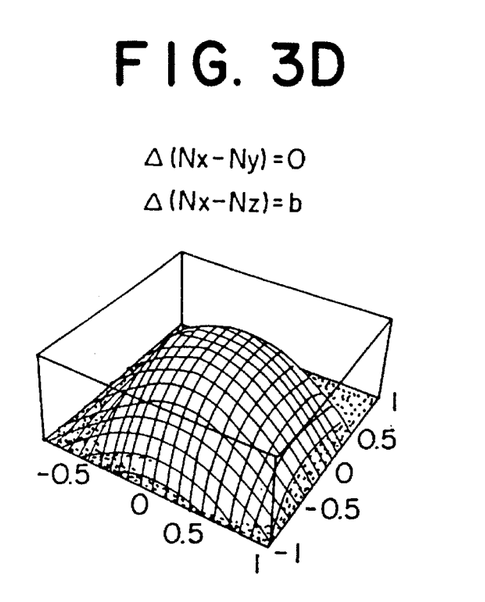
FIG. 3D is a view of the distribution of light intensity of an optical disc having an in-plane birefringence of zero and a perpendicular birefringence.
Figure 4A:
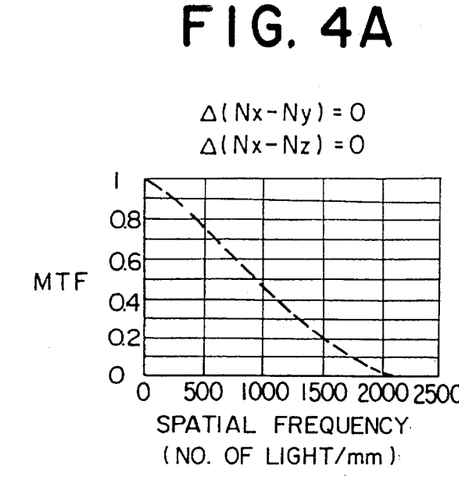
FIG. 4A is a graph of the signal level with respect to the spacial frequency (MTF) of an optical disc having a disc-shaped substrate comprised of glass with an in-plane birefringence and perpendicular birefringence of zero.
Figure 4B:
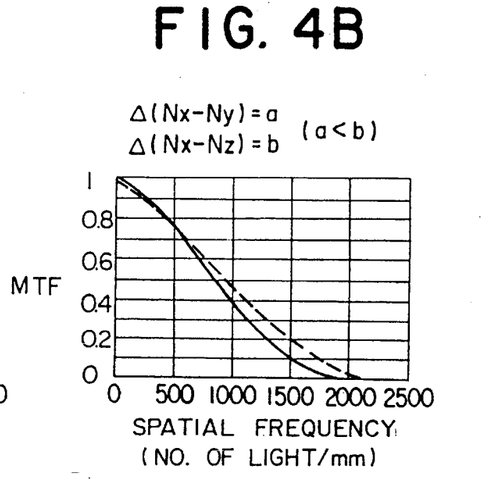
FIGS. 4B and 4C are views of the signal level with respect to the spacial frequency (MTF) of an optical disc having an in-plane birefringence and perpendicular birefringence.
Figure 4C:
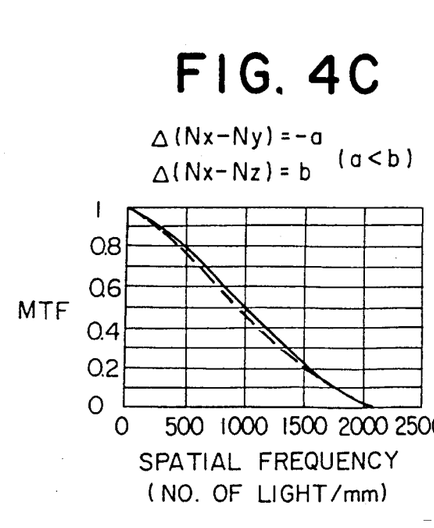
Figure 4D:
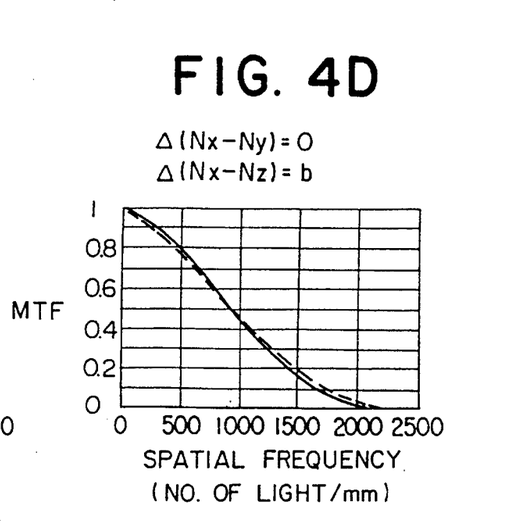
FIG. 4D is a view of the signal level with respect to the spacial frequency (MTF) of an optical disc having an in-plane birefringence of zero and a perpendicular birefringence.

As the birefringence appearing in the disc-shaped substrate of the optical disc, there are the in-plane birefringence defined as $\Delta(Nx-Ny)$ and the perpendicular birefringence defined by $\Delta(Nx-Nz)$ when the substrate surface is the XY-axes and the direction of thickness of the substrate is the Z-axis. An optical disc with a disc-shaped substrate made of glass as an ideal material with an in-plane birefringence and a perpendicular birefringence of both zero is shown in FIG. 3A and FIG. 4A, and an optical disc with a polycarbonate disc-shaped substrate with an in-plane birefringence $\Delta(Nx-Ny)$ of a and a perpendicular birefringence $\Delta(Nx-Nz)$ of b is shown in FIG. 3B and FIG. 4B. Further, an optical disc with a disc-shaped substrate made of polycarbonate with an in-plane birefringence $\Delta(Nx-Ny)$ of -a and a perpendicular birefringence $\Delta(Nx-Nz)$ of b is shown in FIG. 3C and FIG. 4C. FIG. 3D and FIG. 4D show an optical disc with a disc-shaped substrate made of polycarbonate with an in-plane birefringence $\Delta(Nx-Ny)$ of zero and a perpendicular birefringence $\Delta(Nx-Nz)$ of b.

Regarding the distribution of the light intensity, the light intensity is equally distributed in the case of an optical disc provided with a disc-shaped substrate made of glass with a birefringence of zero shown in FIG. 3A. As opposed to this, the total amount of light not only falls in the case of the optical discs shown in FIGS. 3B and 3C, but also the distribution of the light intensity in-plane becomes unbalanced and also the amount of light at the peripheral portions of the pupil partially falls, it will be understood. Further, in the case of the optical disc shown in FIG. 3D, since the in-plane birefringence is zero, not that great an imbalance in the distribution of the light intensity is observed in-plane, but the overall amount of light falls remarkably, it is understood.

Further, similar results are obtained for the reproduced frequency characteristics shown in FIGS. 4A to 4D. Compared with an optical disc with a birefringence of zero as shown in FIG. 4A, it is learned, the reproduced frequency characteristics, that is, the MTF, are degraded in each of the cases of FIGS. 4B to 4D. This is due to the fall in the amount of light at the peripheral areas of the pupil.

The distribution of the intensity of light caused by the biaxial birefringence of the disc-shaped substrate falls in this way because when the converged light passes through the optical disc, the phase delay (retardation) differs depending on the angle of incidence and the amount of the light of the periphery in the distribution of the light intensity after passing through the polarization beam splitter (after wave detection by the polarization beam splitter) falls. This phenomenon becomes more remarkable in effect the greater the numerical aperture (NA).

As mentioned earlier, when use is made of a laser beam generating device 1 as a light source for generating a second harmonic laser light beam, the second harmonic laser light beam transmitting through the polarization beam splitter 4 merely returns to the laser beam generating device 1, so there is no occurrence of mode hop noise due to the very slight amount of returning light beam returning to the light source as in the case of when a semiconductor laser is used as the light source, but the second harmonic laser light beam of the reflected light beam from the optical disc 8 and the second harmonic laser light beam emitted from the laser beam generating device 1 interfere. If the length of the optical path changes on the order of the wavelength, interference noise will be caused and the signal characteristics will degenerate. In this way, it was difficult in the conventional construction to deal with both birefringence and interference noise.

Therefore, if the conventional polarization optical system is used for a high recording density optical disc drive system, for example, a system using an objective lens with a high numerical aperture (NA=0.6), the biaxial birefringence of the disc-shaped substrate of the optical disc would have a detrimental effect on the reproduced signal characteristics and as a result the frequency characteristics would not be improved even if the numerical aperture (NA) were made larger, the crosstalk would increase, or the jitter would increase due to the intersymbol interference, resulting in the problem that the recording density would not in fact be improved.

Further, there was the problem that even if use was made of a nonpolarization optical system, there would be degradation of the signal characteristics due to so-called interference noise where the envelope of the reproduced signal would modulate in accordance with the flutter (vibration) of the optical disc.

SUMMARY OF THE INVENTION

It is, therefore, an object of the present invention to provide an optical pickup apparatus which resolves the above-mentioned problem.

Namely, an object of the present invention is to provide an optical pickup apparatus by which a reproduction frequency is improved, a crosstalk is reduced, and jitter due to an intersymbol interference is reduced, and therefore, which enables an improvement of recording density of a recording medium to which the optical pickup apparatus is used.

Another object of the present invention is to provide an optical pickup apparatus which prevents the deterioration of signal characteristics due to interference noises.

According to the present invention, there is provided an optical pickup apparatus which includes a light source, an objective lens, a nonpolarization beam splitter, a photodetector, and a ¼ wavelength plate. The objective lens focuses the light beam emitted from the light source on to the recording layer of the optical recording medium. The nonpolarization beam splitter is disposed between the objective lens and the light source and separates the light beam emitted from the light source and the light beam reflected by the recording layer of the optical recording medium. The photodetector receives the light beam reflected by the recording layer of the optical recording medium which has been separated by the nonpolarization beam splitter and deflected 90° in optical path. The ¼ wavelength plate is disposed on the path of emission of the light beam emitted from the light source between the nonpolarization beam splitter and optical recording medium.

According to the present invention, even when recording or reproducing data signals using an optical recording medium having a biaxial birefringence, it is possible to improve the recording density, and even when the optical recording medium has birefringence, it is possible to reproduce signals with little degradation.

Further, according to the present invention, it is possible to simplify the construction of the optical pickup apparatus itself, so it is possible to reduce costs.

BRIEF DESCRIPTION OF THE DRAWINGS

The present invention will be more readily understood with reference to the accompanying drawings, wherein:

FIGS. 3A to 3D are views of the distribution of light intensity, wherein

FIGS. 4A to 4D are graphs of the signal level with respect to the spacial frequency (MTF), wherein

FIGS. 6A and 6B are views for explaining interference in an optical pickup apparatus, wherein

DESCRIPTION OF THE INVENTION

Figure 5:
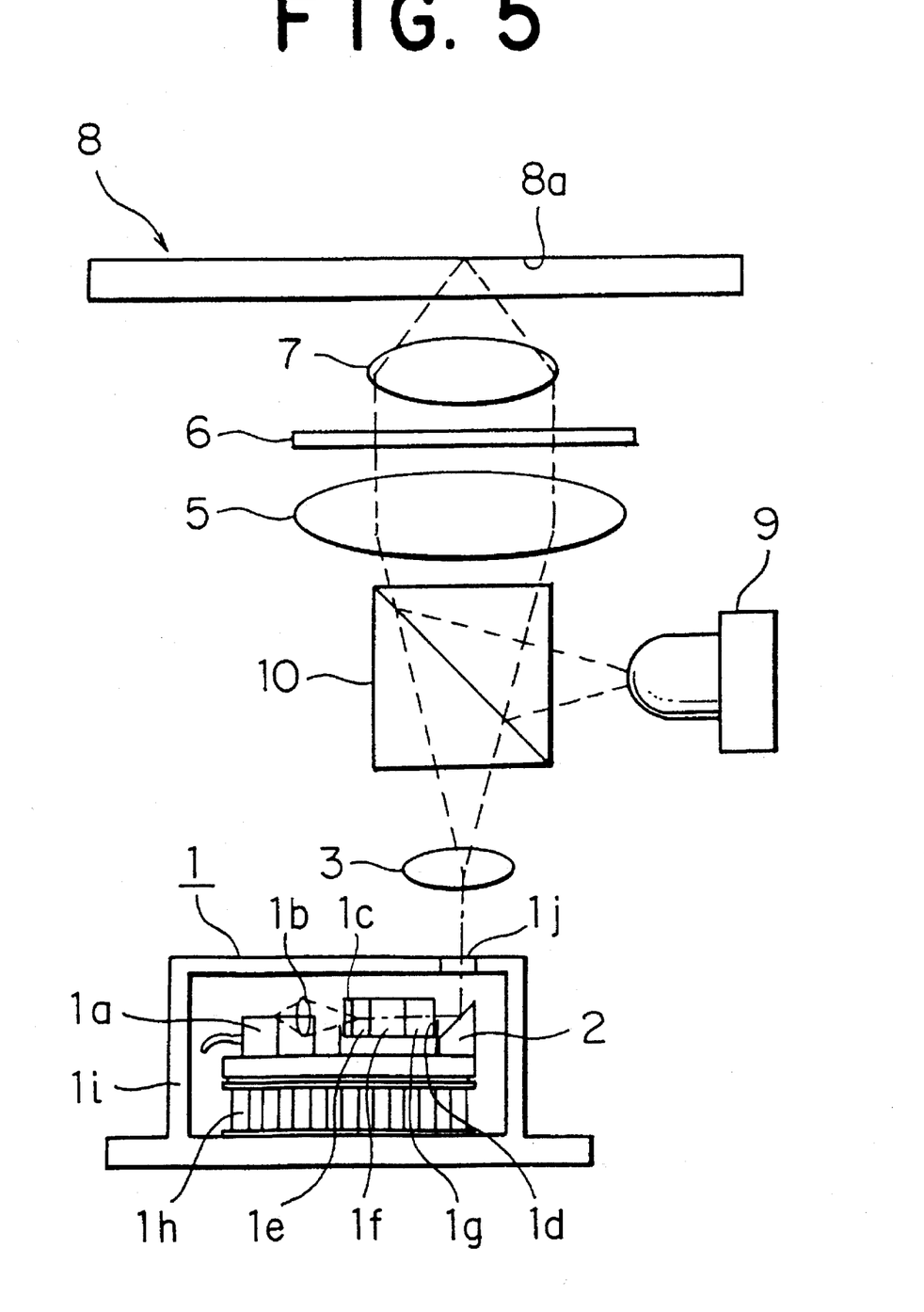
FIG. 5 is a view of the optical path of an optical pickup apparatus according to a first embodiment of the present invention.
Figure 6A:
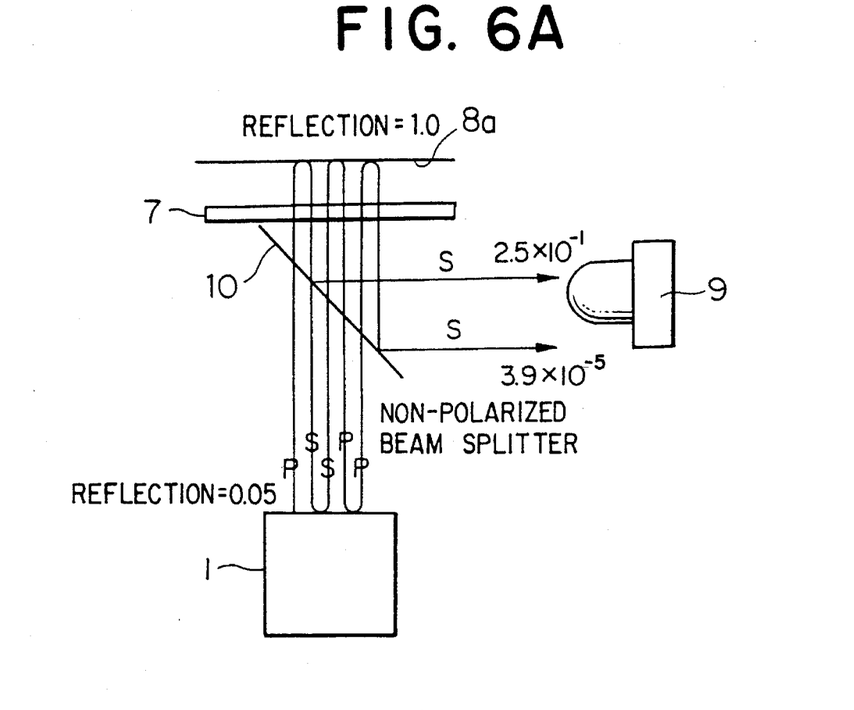
FIG. 6A is a view for explaining the magnitude of the amount of primary light beam and secondary light beam interfering at a light receiving unit according to the present invention and FIG. 6B is a view for explaining the magnitude of the amount of primary light beam and secondary light beam interfering at the light receiving unit according to a nonpolarization optical system as a comparative example.
Figure 6B:
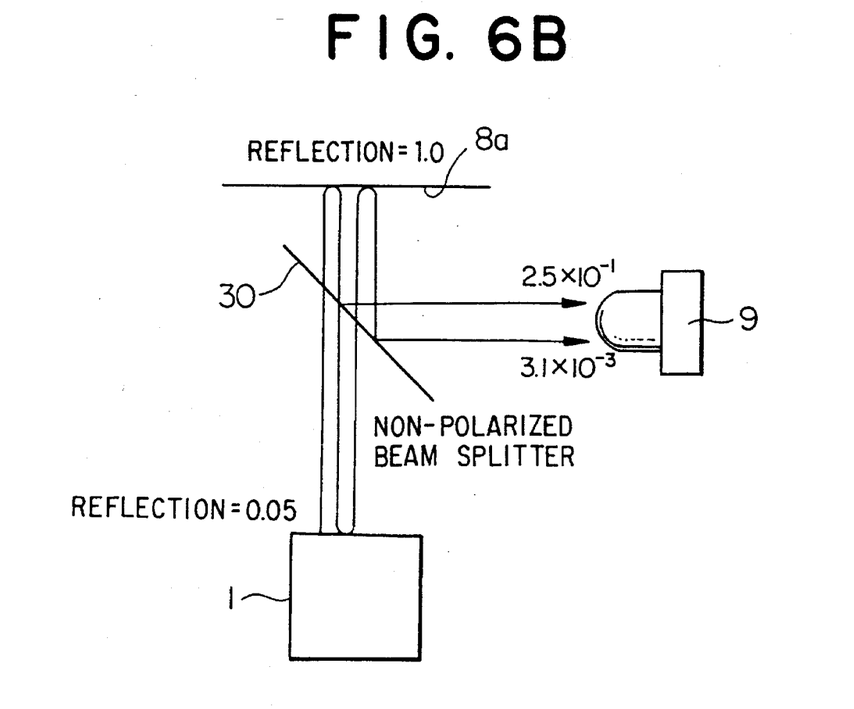
Figure 7:
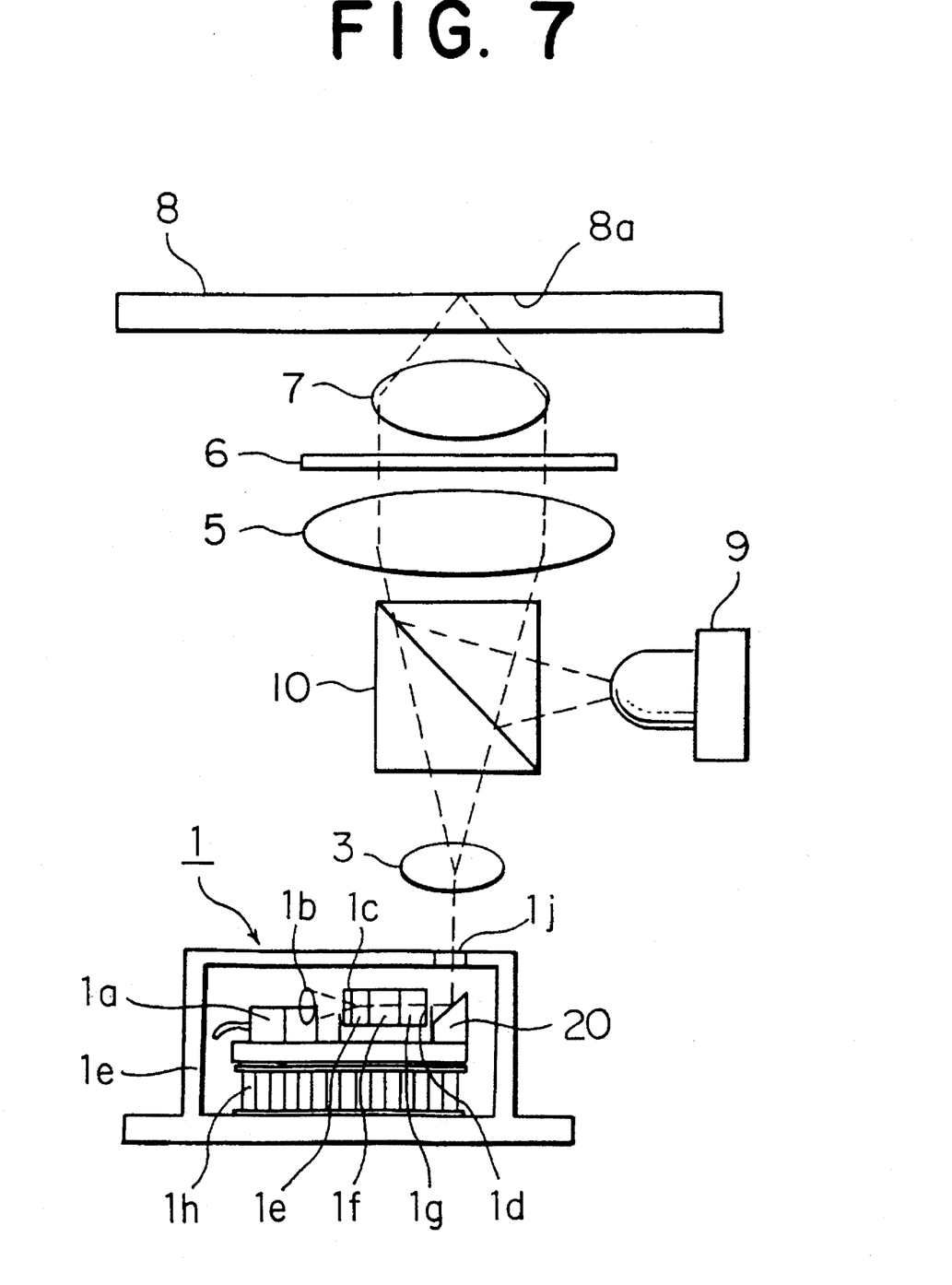
FIG. 7 is a view of the optical path of an optical pickup apparatus according to a second embodiment of the present invention.

Below, the optical pickup apparatus according to the present invention will be explained in detail with references to FIGS. 5 to 7. In FIGS. 5 and 6, like elements corresponding to those in FIGS. 1 and 2 are identified by the same reference numerals and will not be described.

FIG. 5 shows a view of the optical path of the optical pickup apparatus of a first embodiment according to the present invention. The first embodiment uses as the light source the laser beam generating device 1 for outputting a second harmonic laser light beam in the same way as the optical pickup apparatus shown in FIGS. 1 and 2. The second harmonic laser light beam outputted from the laser beam generating device 1 is made a P-polarized light beam. In other words, the second harmonic laser light beam is a linear polarized light beam parallel to the surface of the paper of FIG. 5 in terms of the direction of the electric vector.

In FIG. 5, reference numeral 10 denotes a nonpolarization beam splitter. The nonpolarization beam splitter 10 is provided with an interface for reflecting 50 percent of the incident light beam, in other words, for passing transmitting through 50 percent of the incident light beam. That is, the nonpolarized beam splitter 10 is set with an interface so that transmittance and reflectivity of the P-polarized light beam and the S-polarized light beam become equal and so that the transmittance becomes 50 percent.

Further, in the first embodiment, the ¼ wavelength plate 6 is disposed between the collimator lens 5 and the objective lens 7 in the same way as FIG. 2 and the axis of crystal orientation of the ¼ wavelength plate 6 is set in an azimuth angle of 45° with respect to the polarization direction of the light beam radiated to the ¼ wavelength plate 6. The collimator lens 5 converts the light beam passing through the nonpolarization beam splitter 10 to a parallel light beam larger than the incident pupil of the objective lens 7. Further, for the objective lens 7, use is made of an aspherical lens with infinite magnification.

In such a constructed optical pickup apparatus, the beam of the second harmonic laser light beam emitted from the reflector 1d of the laser beam generating device 1 operating as the light source is deflected 90° by the mirror 2 and emitted toward the beam expander 3. The beam of light is made larger in angle of diffusion by the beam expander 3 and is incident to the nonpolarization beam splitter 10. Fifty percent (50%) of the beam of light incident from the nonpolarization beam splitter 10 passes through, but the remaining 50 percent is reflected at the interface of the nonpolarization beam splitter 10 and is deflected in optical path 90° to the left direction in FIG. 5.

The light beam passing through the nonpolarization beam splitter 10 is converted to a parallel light beam larger than the pupil of the objective lens 7 and is incident to the ¼ wavelength plate 6. The light beam transmitting through the ¼ wavelength plate 6 is converted from a linear polarized light beam to a circularly polarized light beam and incident to the objective lens 7. The light beam is focused on the recording surface 8a of the optical disc 8 by the objective lens 7. The light beam reflected by the recording surface 8a is changed in direction by the recording surface 8a to be reverse to that at the time of incidence on the recording surface 8a. The reflected light beam reflected by the recording surface 8a is converted to a parallel light beam once again by the objective lens 7 and incident to the ¼ wavelength plate 6. The reflected light beam transmitting through the ¼ wavelength plate 6 is converted to a linear polarized light beam from one of circularly polarized light beam, that is, to an S-polarized light beam. The reflected S-polarized light beam is a linear polarized light beam perpendicular in direction of electric vector to the surface of the paper of FIG. 5. The reflected light beam passing through the ¼ wavelength plate 6 is incident to the nonpolarization beam splitter 10. Of the reflected light beam irradiated to the nonpolarization beam splitter 10, 50 percent passes through and returns to the laser beam generating device 1, while the remaining 50 percent of the light beam is deflected in optical path and is received by the photodetector 9.

In the optical pickup apparatus of the first embodiment, the amount of the light beam irradiated to the photodetector 9 in the end becomes 25 percent of the amount of the light beam emitted from the laser beam generating device 1. At the same time, the amount of the light beam returning to the laser beam generating device 1 becomes 25 percent of the amount of the light beam radiated from the laser beam generating device 1.

FIGS. 6A and 6B show the amount of the primary light beam and the secondary light beam interfering on the photodetectors of the optical pickup apparatus of the first embodiment of the present invention and an optical pickup apparatus having a general nonpolarization optical system as a comparative example.

As shown in FIG. 6B, in an optical pickup apparatus having a general nonpolarization optical system of the comparative example, if the reflectivity of the recording surface 8a of the optical disc is made 1.0, the reflectivity (transmittance) of the nonpolarization beam splitter 30 is made 0.5, and the reflectivity of the resonator endface of the laser beam generating device 1 used as a light source is made 0.05, the amount of the primary light beam, that is, the reflected light beam reflected by the recording surface 8a of the optical disc 8 and reflected by the nonpolarization beam splitter becomes $2.5 \times 10^{-1}$ based on the output of the light source as 1.0. The amount of the secondary light beam, that is, the light beam emitted from the laser beam generating device 1, reflected by the recording surface 8a, passing through the nonpolarization beam splitter 30, reflected once again by the laser beam generating device 1, and once again traveling to the recording surface 8a and nonpolarization beam splitter 30 to reach the photodetector 9 becomes $3.1 \times 10^{-3}$. Therefore, the ratio of intensity of the primary light beam and the secondary light beam is only about 40 dB, so interference noise is caused and signal degradation occurs.

As opposed to this, in the optical pickup apparatus according to the first embodiment of the present invention shown in FIG. 6A, no interference will occur on the photodetector 9 so long as the secondary light beam and the primary light beam do not become the same polarized light beam, that is, the S-polarized light beam. Accordingly, the secondary light beam in the first embodiment becomes the light beam which resonates twice and bounds back and forth twice between the endface of the resonator of the laser beam generating device 1 used as the light source and the recording surface 8a of the optical disc 8. More specifically, if the output of the light source is made 1.0, the intensity of the primary light beam becomes $2.5 \times 10^{31\ 1}$ and the intensity of the secondary light beam becomes $3.9 \times 10^{-5}$. The ratio of intensity of the primary light beam and secondary light beam becomes a large 80 dB, so the interference noise almost completely disappears and it is possible to reproduce signals well.

Next, an optical pickup apparatus of a second embodiment of the present application will be described in detail of with reference FIG. 7. In FIG. 7, like elements corresponding to those in FIGS. 1 and 2 are identified by the same reference numerals and will not be described.

In the optical pickup apparatus of the second embodiment, in addition to the total reflection mirror of the mirror 2 for deflecting the light beam to the upward direction, provision is made of a polarization beam splitter 20. This polarization beam splitter 20 has the function of a deflecting mirror for deflecting by 90° the second harmonic laser light beam outputted from the reflector 1d constituting part of the resonator of the laser beam generating device 1. The second harmonic laser light beam outputted from the reflector 1d of the laser beam generating apparatus 1 is a P-polarized light beam which is deflected 90° in optical path at the polarization beam splitter 20 and irradiated to the beam expander 3. From the beam expander 3 on, the light beam changes in the optical path and state of polarization in the same way as the first embodiment and is received by the photodetector 9. Accordingly, the reflecting light beam reflected by the recording surface 8a of the optical disc 8 becomes an S-polarized light beam as mentioned in the first embodiment. The light beam reflected by the recording surface 8a is reflected 50 percent by the nonpolarization beam splitter 10, with the remaining 50 percent transmitting through the nonpolarization beam splitter 10 to reach the polarization beam splitter 20. The reflected light beam, however, is a S-polarized light beam, so is not deflected in optical path by the polarization beam splitter 20, so it is possible to suppress to an extreme extent the reflected light beam to the laser beam generating device 1.

By doing this, in the optical pickup apparatus of the second embodiment, by using the polarization beam splitter 20, the polarization and separation become more powerful and the ratio of intensity of the primary light beam and secondary light beam interfering at the photodetector 9 can be made over 100 dB. In the second embodiment, the example is shown of the polarization beam splitter 20 disposed between the resonator of the laser beam generating device 1 and the beam expander 3, but the invention is not limited to this. It may be disposed anywhere in the optical path between the nonpolarization beam splitter 10 and the laser beam generating device 1 and may also be disposed between the beam expander 3 and the nonpolarization beam splitter 10.

In the above embodiments, the explanation was made taking as an example an optical pickup apparatus using as a light source a laser beam generating device radiating a second harmonic laser light beam, but the invention is not limited to a laser beam generating device generating a second harmonic laser light beam as a light source and a similar effect can be exhibited even if using a light source with a high reflectivity at the resonator endface, for example, a gas laser, or a semiconductor laser with a high endface reflectivity.

Note that the embodiments explained above were described to facilitate understanding of the present invention and were not described to limit the invention. Accordingly, the elements disclosed in the above embodiments include all design modifications and equivalents falling under the technical scope of the invention.

In particular, so long as the positional relationship between the optical disc 2, the ¼ wavelength plate 6, and the nonpolarization beam splitter 10 is not destroyed, the positions at which the objective lens 9 and the collimator lens 5 are set is not limited to those of the illustrated embodiment. For example, the ¼ wavelength plate 6 could be positioned between the objective lens 7 and the optical recording medium 8.

Further, use made be made of an objective lens with a finite magnification rate as the objective lens 9 as well. The light beam radiated from the light source 1 may be either P-polarized light beam or S-polarized light beam so long as it is linear polarized light beam. While the preferred embodiments employ a nonpolarization beam splitter 10 having a transmittance and reflectance ratio of 50%, in other, less preferred embodiments, this ratio could be between 40/60 and 60/50, with less desirable results.

What is claimed is:

1. An optical pickup apparatus comprising:

a light source;

an objective lens for focusing a light beam emitted from said light source on to a recording layer of an optical recording medium;

a nonpolarization beam splitter disposed between said objective lens and said light source for separating the light beam radiated from the said light source and a light beam reflected by the recording layer of the optical recording medium;

a photodetector receiving the light beam reflected by the recording layer of the optical recording medium, which had been separated by the said nonpolarization beam splitter; and a ¼ wavelength plate disposed on a path of emission of the light beam emitted from the light source between the nonpolarization beam splitter and the optical recording medium.

2. An optical pickup apparatus according to claim 1, wherein said ¼ wavelength plate is disposed between said nonpolarization beam splitter and said objective lens.

3. An optical pickup apparatus according to claim 1, wherein said ¼ wavelength plate is disposed between said objective lens and the optical recording medium.

4. An optical pickup apparatus according to claim 1, wherein said nonpolarization beam splitter has a reflectivity of 40 percent to 60 percent with respect to the light beam irradiated on said nonpolarization beam splitter.

5. An optical pickup apparatus according to claim 1, wherein a polarization beam splitter is further disposed between said light source and said nonpolarization beam splitter.

6. An optical pickup apparatus according to claim 1, wherein said light source comprises an excitation light source and a resonator, said resonator includes a laser medium excited by said excitation light source and a non-linear optical crystal element which is irradiated with a fundamental wavelength laser light beam generated by said laser medium and generates a high harmonic laser light beam.

7. An optical pickup apparatus according to claim 6, wherein said light source further comprises a polarization beam splitter which deflects by 90° the optical path of the high harmonic laser light beam outputted from said resonator.

8. An optical pickup apparatus comprising:

a light source having a resonator endface with a high reflectivity;

an objective lens for focusing a light beam radiated from said light source onto a recording layer of an optical recording medium;

a nonpolarization beam splitter disposed between said objective lens and said light source for separating the light beam emitted from the said light source and a light beam reflected by the recording layer of the optical recording medium;

a photodetector receiving the light beam reflected by the recording layer of the optical recording medium, which had been separated by said nonpolarization beam splitter; and a ¼ wavelength plate disposed on a path of emission of the light beam emitted from said light source between said nonpolarization beam splitter and the optical recording medium.

9. An optical pickup apparatus according to claim 8, wherein said light source is provided with an excitation light source, said resonator comprises a laser medium excited by said excitation light source and a non-linear optical crystal element which is irradiated with a fundamental wavelength laser light beam generated from said laser medium and generates a high harmonic laser light beam.

10. An optical pickup apparatus according to claim 9, wherein said light source further comprises a polarization beam splitter which deflects by 90° the optical path of the high harmonic laser light emitted from said resonator.

11. An optical pickup apparatus according to claim 8, wherein said ¼ wavelength plate is disposed between said nonpolarization beam splitter and said objective lens.

12. An optical pickup apparatus according to claim 8, wherein said nonpolarization beam splitter has a reflectivity of 40 percent to 60 percent with respect to the light beam irradiated on said nonpolarization beam splitter.

* * * * *